(12) United States Patent
Burnim et al.

(10) Patent No.: US 9,053,227 B2
(45) Date of Patent: Jun. 9, 2015

(54) CONCURRENT ASSERTION

(75) Inventors: Jacob Samuels Burnim, Berkeley, CA (US); Madanlal Musuvathi, Redmond, WA (US); Shaz Qadeer, Mercer Island, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 386 days.

(21) Appl. No.: 13/415,854

(22) Filed: Mar. 9, 2012

(65) Prior Publication Data

US 2013/0239120 A1    Sep. 12, 2013

(51) Int. Cl.
*G06F 9/46* (2006.01)
*G06F 11/36* (2006.01)
*G06F 9/48* (2006.01)

(52) U.S. Cl.
CPC .......... *G06F 11/3604* (2013.01); *G06F 9/4881* (2013.01)

(58) Field of Classification Search
None
See application file for complete search history.

(56) References Cited

U.S. PATENT DOCUMENTS

| | | | |
|---|---|---|---|
| 4,937,733 A * | 6/1990 | Gillett et al. | 710/108 |
| 5,655,115 A * | 8/1997 | Shen et al. | 712/239 |
| 5,892,931 A * | 4/1999 | Cohen et al. | 710/312 |
| 5,956,524 A * | 9/1999 | Gajjar et al. | 710/62 |
| 7,143,373 B2 * | 11/2006 | Moorby | 716/106 |
| 7,316,005 B2 * | 1/2008 | Qadeer et al. | 717/131 |
| 8,174,912 B2 * | 5/2012 | Warren | 365/189.16 |
| 2005/0209840 A1 * | 9/2005 | Baklashov et al. | 703/22 |
| 2005/0265088 A1 * | 12/2005 | Ishizaki | 365/189.12 |
| 2009/0113403 A1 | 4/2009 | Davis et al. | |
| 2009/0204931 A1 | 8/2009 | Lim et al. | |
| 2010/0169618 A1 | 7/2010 | Ramalingam et al. | |
| 2011/0107307 A1 * | 5/2011 | Liu et al. | 717/125 |
| 2011/0113285 A1 * | 5/2011 | Dolby et al. | 714/28 |

OTHER PUBLICATIONS

Kerfoot, et al., "Checking Concurrent Contracts with Aspects", Retrieved at <<http://www.cs.ox.ac.uk/files/2544/aspect_paper.pdf>>, Proceedings of the ACM Symposium on Applied Computing, 2010, pp. 2523-2530.
Nienaltowski, et al., "Contracts for concurrency", Retrieved at <<http://se.inf.ethz.ch/old/people/nienaltowski/papers/contracts_for_concurrency.pdf>>, Jul. 2009, pp. 305-318.
Betin-Can, et al., "Highly Dependable Concurrent Programming Using Design for Verification", Retrieved at <<http://www.cs.ucsb.edu/~bultan/publications/facj.pdf>>, Jun. 2007, pp. 243-268.

(Continued)

*Primary Examiner* — Van Nguyen
(74) *Attorney, Agent, or Firm* — Steve Wight; Raghu Chinagudabha; Micky Minhas

(57) ABSTRACT

A concurrency assertions system disclosed herein provides for atomic evaluation of an assertion expression by locking an assertion lock upon initiating an assertion and thereby protecting the assertion evaluation from concurrent modifications to the variables in the assertion expressions. When a violation of an assertion is detected, the concurrency assertions system ensures that the exception statistics at the time of the assertion violation represents a program state where the assertion is violated, thus improving analysis of assertion violations. Furthermore, the concurrency assertions system continuously evaluates an expression for an assertion for a time period while other threads in the program are being executed.

18 Claims, 6 Drawing Sheets

(56) References Cited

OTHER PUBLICATIONS

Guerraoui, et al., "A Scalable and Oblivious Atomicity Assertion", Retrieved at <<http://infoscience.epfl.ch/record/125016/files/SOARTR.pdf>>, Proceedings of the 19th international conference on Concurrency Theory, Jun. 9, 2008, pp. 52-66.

Hanus, Michael, "Lazy and Enforceable Assertions for Functional Logic Programs", Retrieved at <<https://www.informatik.uni-kiel.de/~mh/publications/papers/WFLP10_LNCS.pdf>>, Proceedings of the 19th international conference on Functional and constraint logic programming, 2010, pp. 84-100.

* cited by examiner

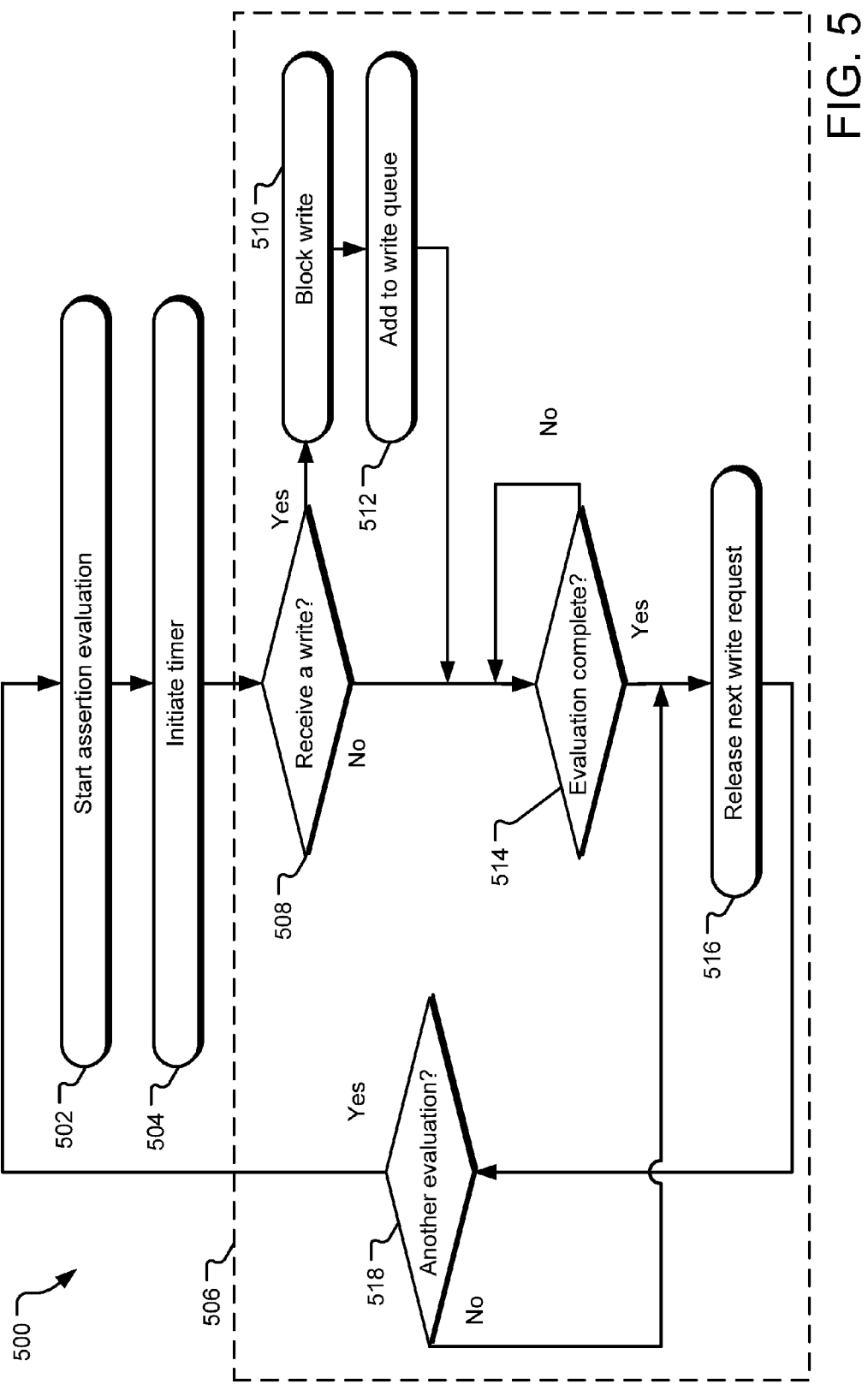

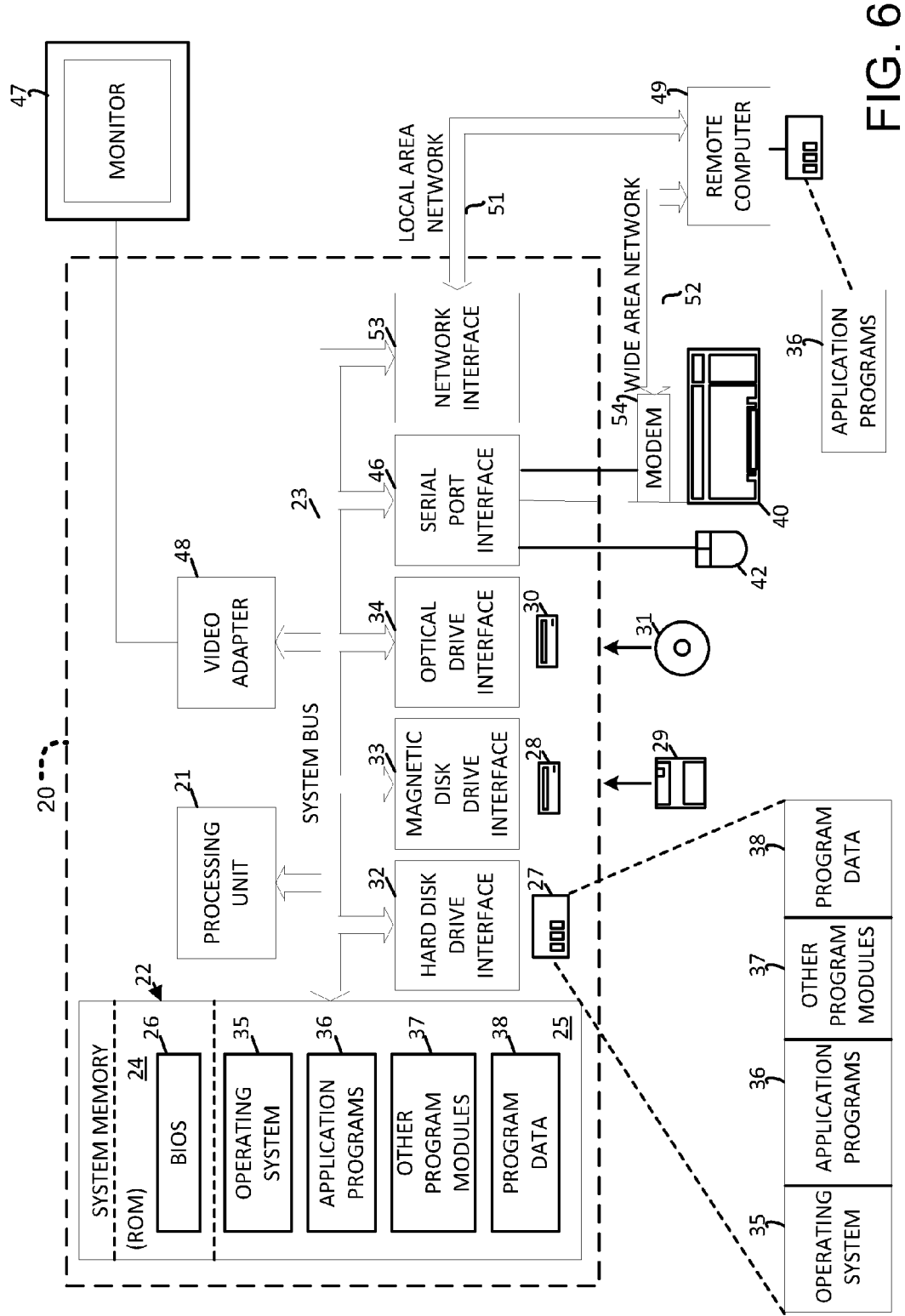

CONCURRENT ASSERTION

BACKGROUND

Concurrent programs are programs where there are multiple threads that are executing simultaneously. For example, for a computer having a single microprocessor, a scheduler of the computer operating system multiplexes multiple programs running simultaneously on the microprocessor. In multiprocessor systems, the operating system multiplexes multiple programs running simultaneously on each of the multiple processors. As a result, it is likely that more than one of such programs use common variables. For example, if a computer processor is running an e-mail program, a text messaging program, and a voice-mail messaging program, each of these programs refers to a variable denoting the total number of messages, including e-mail messages, text message, and voice-mail messages.

Generally, computer programs use assertion constructs for checking programmer assumptions at various points in the program. For example, an e-mail program running on a computer uses an assertion to ascertain that the value of the variable for the total number of messages received by the computer system is greater than or equal to the variable for the number of unread messages. However, when multiple threads are running concurrently, such an assertion checking the number of messages in one thread may fail in some circumstances due to the change in the value of the variables used in the assertion by other concurrent threads. In some circumstances this results in spurious failure of the assertion.

SUMMARY

Implementations described and claimed herein address the foregoing problems by providing concurrency assertions in a multi-threaded environment. The concurrency assertions provide atomic evaluation of each particular assertion expression such that no variables of that particular assertion expression are altered by any other expressions during the evaluation of that particular assertion expression. The concurrency assertions also provide continuous evaluation of a particular assertion expression for a period of time such that during such continuous evaluation, any violation resulting from a write to one of the variables of that particular expression also results in violation of that particular assertion expression. Furthermore, when an assertion violation is detected, concurrency assertions provide a program checkpoint that reflects the value of the variables of the violated assertion expression at the time of the violation.

A method of managing the concurrency assertions locks an assertion lock upon initiating evaluation of a first assertion expression so that no other assertions are evaluated during the evaluation of the first assertion expression. Initiating the evaluation of the first assertion also initiates a monitoring operation that monitors write access attempts to various variables of the first assertion. If the monitoring operation determines that a write access attempt to a variable of the first assertion is received, such a write access attempt is added to a write access attempts queue. Subsequently, after evaluation of the first assertion expression, a write access attempt from the write access attempts queue is released.

In some implementations, articles of manufacture are provided as computer program products. One implementation of a computer program product provides a tangible computer program storage medium readable by a computing system and encoding a processor-executable program. Other implementations are also described and recited herein.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Other implementations are also described and recited herein.

BRIEF DESCRIPTIONS OF THE DRAWINGS

FIG. 5 illustrates example operations for providing continuous assertion evaluations using a concurrency assertions system.

FIG. 6 illustrates an example system that may be useful in implementing the described technology.

DETAILED DESCRIPTIONS

Assertions are used during programming to enable a programmer to test his or her assumptions about the program. For example, a programmer developing a messaging program uses an assertion expression that states that the total number of messages read by a user is less than the total number of messages. In one implementation, an assertion includes multiple expressions. Each assertion expression contains a Boolean expression that is believed to be true when that assertion expression executes. Therefore, an evaluation of an assertion expression to a false value triggers a violation of the assertion expression.

In one implementation of a multi-threaded computing environments where a number of program threads are running concurrently, one or more of such programming threads includes an assertion expression. Furthermore each of the assertions in such multi-threaded environment may include multiple expressions. In such an implementation, to avoid spurious failure of such multiple expression assertion, each of the expressions is evaluated atomically such that no variables of the assertion expressions are changed in between evaluation of the multiple assertion expressions. Furthermore, when an assertion violation is detected in a multi-threaded environment, a snapshot of the program taken after a violation of an assertion expression may not provide accurate values, if between the detection of the violation and the taking of the checkpoint, a value of at least one of the variables included in the checkpoint is changed. In such a case, the program checkpoint may not prove useful to the programmer in evaluating the reasons for the violations of the assertion expression.

In sequential programming, an assertion is evaluated only once for a certain given time period, where such time period is based on the particular implementation of the sequential program. There is no need to evaluate it again within such time period because, after an assertion is evaluated successfully, given the particular implementation of the sequential program, there is no other program thread changing the assertion. Thus, if the assertion succeeds at a given evaluation, it is presumed to succeed no matter how many times it is evaluated again within the time period. In concurrent execution of multiple threads, when an assertion is evaluated atomically and successfully at a given particular time, due to the existence of the other threads, there is no guarantee that when the assertion is evaluated again, it will be evaluated successfully. Therefore, to increase the coverage of the assertion, a decision has to be made as to how often an assertion should be evaluated and at what time period.

Figure 1:
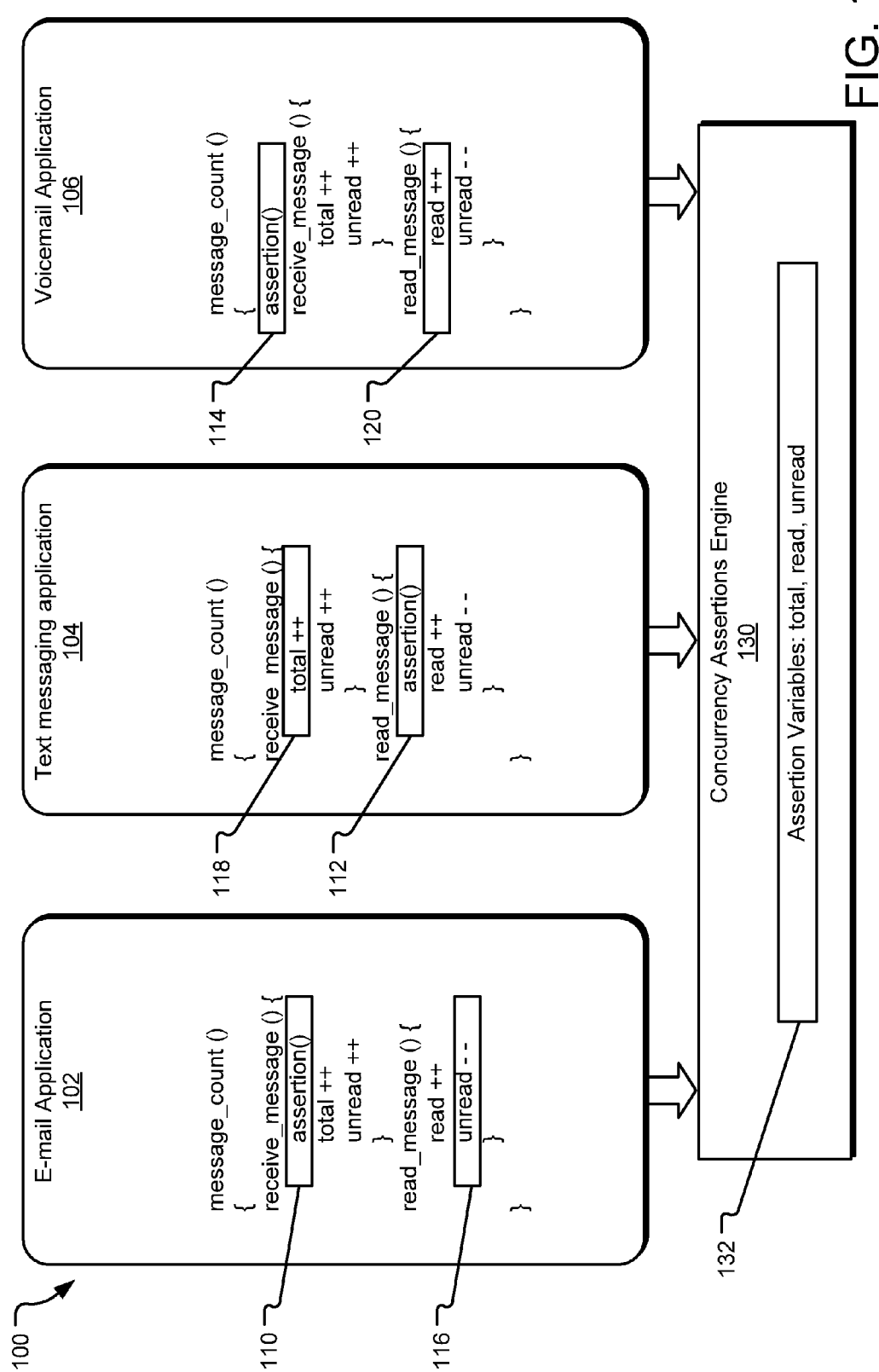
FIG. 1 illustrates example data sources and flows for a concurrency assertions system.

FIG. 1 illustrates example data sources and flows for a concurrency assertions system 100. The concurrency assertions system 100 operates in a multi-threaded messaging system that includes an e-mail application 102, a text-messaging application 104, and a voicemail application 106. The applications 102, 104, 106 use various variables to keep track of the number of messages used by the applications. For example, a variable "total" stores the value of the total number of messages, a variable "read" stores the value of the number of messages that are already read by the user, and a variable "unread" stores the value of the number of unread messages. Because the applications 102, 104, 106 are running concurrently, they share various variables "total," "read," and "unread" between them. Alternatively, 102, 104, 106 are multiple threads of a same application.

Each of the applications 102, 104, 106 includes assertions to check the validity of various programming assumptions. For example, the e-mail application 102 includes an assertion 110, the text-messaging application 104 includes an assertion 112, and the voicemail application 108 includes an assertion 114. In one implementation, each of the assertion 110, 112, 114 includes multiple expressions. For example, the assertion 110 includes an assertion expression that is evaluated as true when the total number of messages, as represented by the value of the "total" variable, is non-negative (i.e., total>=0). The assertion 110 also includes another assertion expression that is evaluated as true when the value of the "total" variable is equal to the sum of the values of the "unread" and the "read" variables (i.e., total=read+unread).

Furthermore, each of the applications 102, 104, 106 also includes various write operations that modify the value of the variables "read," "unread," and "total." For example, the e-mail application 102 include a write operation 116 that decrements the value of the "unread" variable after reading a message. Similarly, the text-messaging application 104 includes a write operation 118 that increments the value of the "total" variable in response to receiving a text-message and the voicemail application 106 includes a write operation 120 that increments the value of the "read" variable after reading a voicemail.

The concurrency assertions system 100 includes a concurrency assertions engine 130 that manages the assertions 110, 112, 114. Specifically, the concurrency assertions engine 130 ensures that each of the assertions 110, 112, 114 is evaluated atomically. Thus, the concurrency assertions engine 130 ensures when the assertion 110 is being evaluated, all expressions of the assertion 110 are evaluated together. Thus, if the assertion 110 includes an expression that is true when the total number of messages is equal to the number of unread and the number of read messages, and a second expression that is true when the total number of messages is non-negative, both of these expressions are evaluated before any other operation changes the values of any of the "total," "read," and "unread" variables.

In one implementation of the concurrency assertions system 100, the assertion evaluation engine 130 locks an assertion lock upon the initiation of the assertion 110. Thus, once the assertion 110 starts evaluating the expressions of the assertion 110, the other assertions 112, 114 are blocked from initiating their evaluation. As a result, all expressions of the assertion 110 are evaluated before any of the assertions 112 and 114 initiate evaluating.

In an alternative implementation of the concurrency assertions system 100, the concurrency assertions engine 130 ensures atomic evaluation of the assertion 110 by monitoring the write access attempts to any of the variables used in the assertion 110. If the concurrency assertions engine 130 determines that a write access attempt to one of the variables of the assertion 110 is initiated, such a write access attempt is blocked and added to a write attempts queue. Thus, for example, when the assertion 110 is being evaluated, if the write operation 118 attempts to change the value of the "total" variable, the write operation 118 is blocked from executing and added to the write attempts queue. Similarly, when the assertion 110 is being evaluated, if the write operation 120 attempts to change the value of the "read" variable, the write operation 120 is also blocked from executing and added to the write attempts queue. In one implementation, the assertion engine 130 generates a notification in response to receiving or determining a write access attempt to the variable of the assertion 110.

In one implementation, once the concurrency assertions engine 130 initiates evaluating the assertion 110, the concurrency assertions engine 130 blocks any changes to the values of the variables used in the assertion 110. Alternatively, the concurrency assertions engine 130 also blocks the values of other variables that affect the value of the variables used in the assertion 110 from being changed. In one implementation, the concurrency assertions engine 130 blocks changes to all variables in a memory page, a memory table, a piece of contiguous memory, etc., that stores the variables of the assertion 110.

Subsequently, the concurrency assertions engine 130 evaluates assertion 110. If the assertion 110 is evaluated successfully, that is, if the values of all expressions in the assertion 110 are evaluated to be true, the concurrency assertions engine 130 releases the assertion lock. As a result, evaluation of other assertions, such as assertion 112, 114 is enabled. In one implementation, if the assertion is evaluated successfully, the concurrency assertions engine 130 also releases one write access attempt from the write access attempts queue. In one implementation, a first-in-first-out (FIFO) rule is used in releasing write access attempts from the write access queue. However, in an alternative implementation, other rules for releasing the write access attempts are used. In addition, an alternative implementation might not require holding the assertion lock and evaluate multiple assertions concurrently.

If the evaluation of the assertion 110 is unsuccessful, that is, if the value of at least one expression in the assertion 110 is evaluated to be false, an exception signal is generated. In response to receiving such exception signal, the concurrency assertions engine 130 generates an output of assertion violation state including the current status of all registers related to the assertion 110, status of other variables that affect the variables of the assertion 110, etc. In one implementation, the assertion violation state also includes statistics (e.g., checkpoints) regarding all variables in memory page, a memory table, etc., that includes the variables of the assertion 110. In such a case where the evaluation of the assertion 110 is unsuccessful, the assertion lock is released after the assertion violation statistics is generated and saved. Furthermore, the concurrency assertions engine 130 also releases one write operation from the write queue after the assertion violation checkpoint is generated and saved. However, in an alternative implementation, an exception signal generated in response to violation of an assertion evaluation causes a shutdown of the various concurrent threads.

Figure 2:
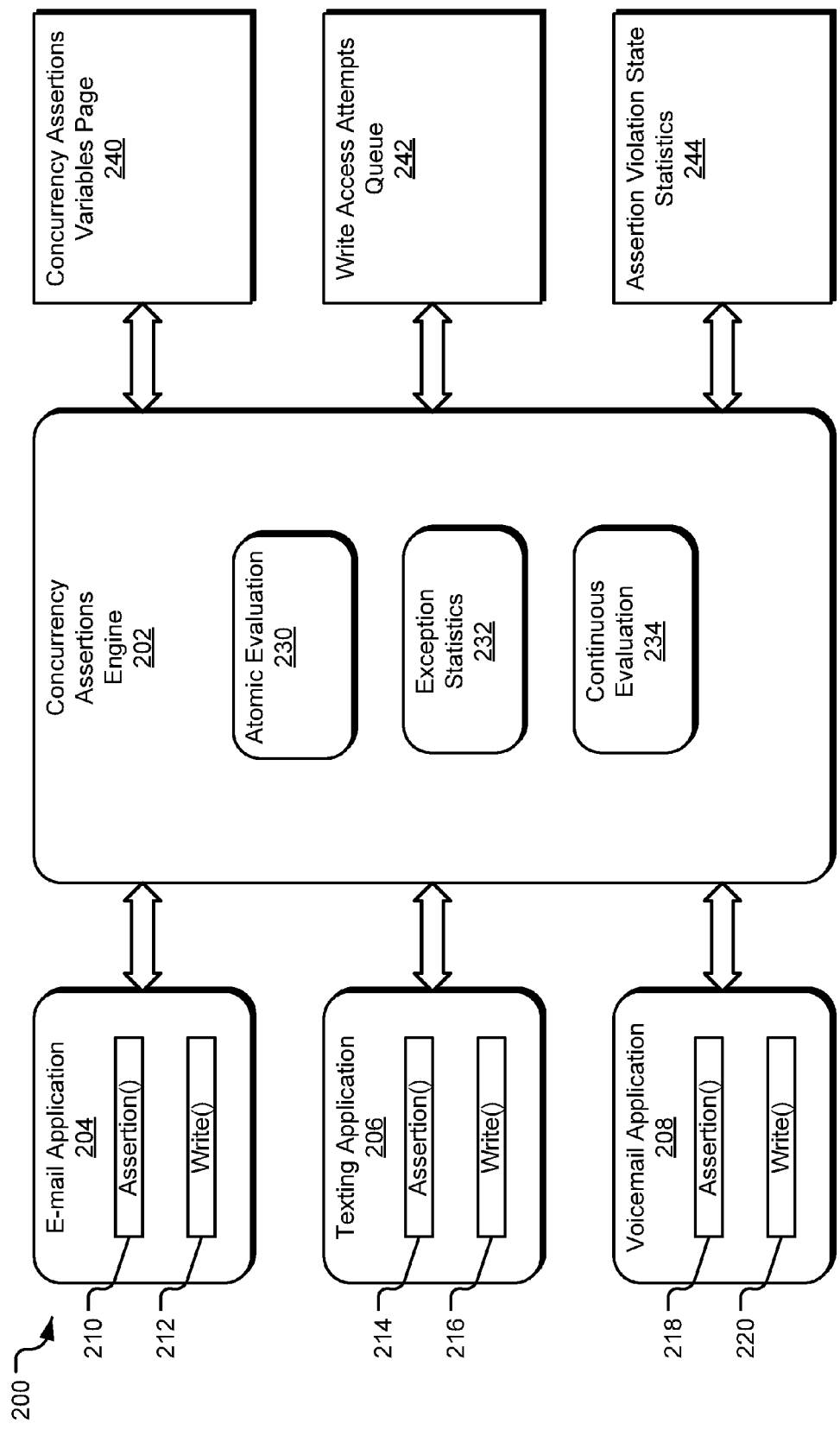
FIG. 2 illustrates alternative example data sources and flows for a concurrency assertions system.

FIG. 2 illustrates alternative example data sources and flows for a concurrency assertions system 200. The concurrency assertions system 200 includes a concurrency assertions engine 202 that manages assertions in a multi-threaded computing environment. Specifically, the multithreaded computing environment includes an e-mail application 204, a texting application 206, and a voicemail application 208. Each of the applications 204, 206, 208 includes an assertion and a write operation where the write operation writes to at least one of the variables used in the assertion. For example, the e-mail application 204 includes an assertion 210 and a write operation 212. Similarly, the texting application includes an assertion 214 and a write operation 216, whereas the voicemail application 208 includes an assertion 218 and a write operation 220.

In one implementation, each of the assertions 210, 214, 218 shares variables with other of the assertions 210, 214, 218. For example, the assertion 210 evaluates the non-negativity of the total number of messages and the assertion 214 evaluates the equality of the total number of messages and the sum of the number of read messages and the number of unread messages. Furthermore, each of the write operations 212, 216, 220 changes the value of a variable used in the assertions 210, 214, 218. The concurrency assertions engine 202 includes various modules that manage the assertions 210, 214, 218 and the write operations 212, 216, 220. One implementation of the concurrency assertions engine 202 includes an atomic evaluation module 230, an exception statistics module 232, and a continuous evaluation module 234. While FIG. 2 illustrates the modules 230, 232, 234 as distinct modules from each other, in one implementation such modules are implemented together as part of a single application that includes calls each of such modules 230, 232, 234. Furthermore, one of the modules 230, 232, 234 may also be called from another of these module 230, 232, 234.

In one implementation, the atomic evaluation module 230 is configured to ascertain that all expressions of any particular assertion are evaluated atomically. For example, the atomic evaluation module 230 is configured to block all other assertions other than a particular assertion being currently evaluated. Thus, if the assertion 210 is being currently evaluated, the atomic evaluation module 230 blocks assertions 214 and 218 from being evaluated until evaluation of assertion 210 is complete. In one implementation, the atomic evaluation module 230 secures an assertion lock upon initiating evaluation of the assertion 210. Subsequently, all expressions of the assertion 210 are evaluated consecutively before any other assertions are evaluated. Furthermore, the atomic evaluation module 230 also initiates various watch points over the variables of the assertion 210. If it is determined that a write operation may change the value of one of the variables used by any of the expressions of the assertion 210, the atomic evaluation module 230 blocks such write operation.

The exception statistics module 232 is configured to save the exception statistics associated with the checkpoints when an exception is generated by any of the assertions. For example, during the evaluation of the assertion 210, if one of the assertion expressions is evaluated to be false, an exception is generated. In response to such an exception, the exception statistics module 232 generates an output of the exception statistics related to the status of all variables related to the checkpoints associated with the assertion 210. In one implementation, the exception statistics module 232 stores such exception statistics in an assertion violation state statistics datastore 244.

The continuous evaluation module 234 is configured to ascertain that each of the assertions 210, 214, 218 is continuously evaluated for a period of time during which any violation resulting from the writes to the variables used in an assertion triggers a violation. For example, if the assertion 210 is being evaluated, and assertion 210 uses a "total" variable, the continuous evaluation module 234 ensures that for a given period of time, any attempt to write to the "total" variable triggers a violation. In one implementation, the time period for which any attempts to the variables of the assertion being evaluated generates a violation is based on heuristics of the past monitoring of the assertions.

In one implementation, the continuous evaluation module 234 monitors all variables of a concurrency assertions variables page 240. In an alternative implementation, when a write access attempt to a variable on the concurrency assertions variables page 240 is detected, the continuous evaluation module 234 adds such write access attempt to a write access attempts queue 242. In one implementation, the concurrency assertions variables page 240 is a memory page, a memory table, a section of memory on which the variables of the assertion 210 are located, etc. Subsequently, when the evaluation of the assertion 210 is completed, the continuous evaluation module 234 releases one write access attempt from the write access attempts queue 242.

In one alternative implementation, the continuous evaluations module 234 determines the write operations to the variables of the assertion 210 by disassembling the instructions that are scheduled to execute at the current program counter. If any of such disassembled instructions includes a write access attempt to a variable of the assertion 210, such write access attempt is added to the write access attempts queue 242. In one implementation, disassembling the instructions that are scheduled to execute at the current program counter includes dynamically interpreting assembly instructions of the assertion 210.

Figure 3:
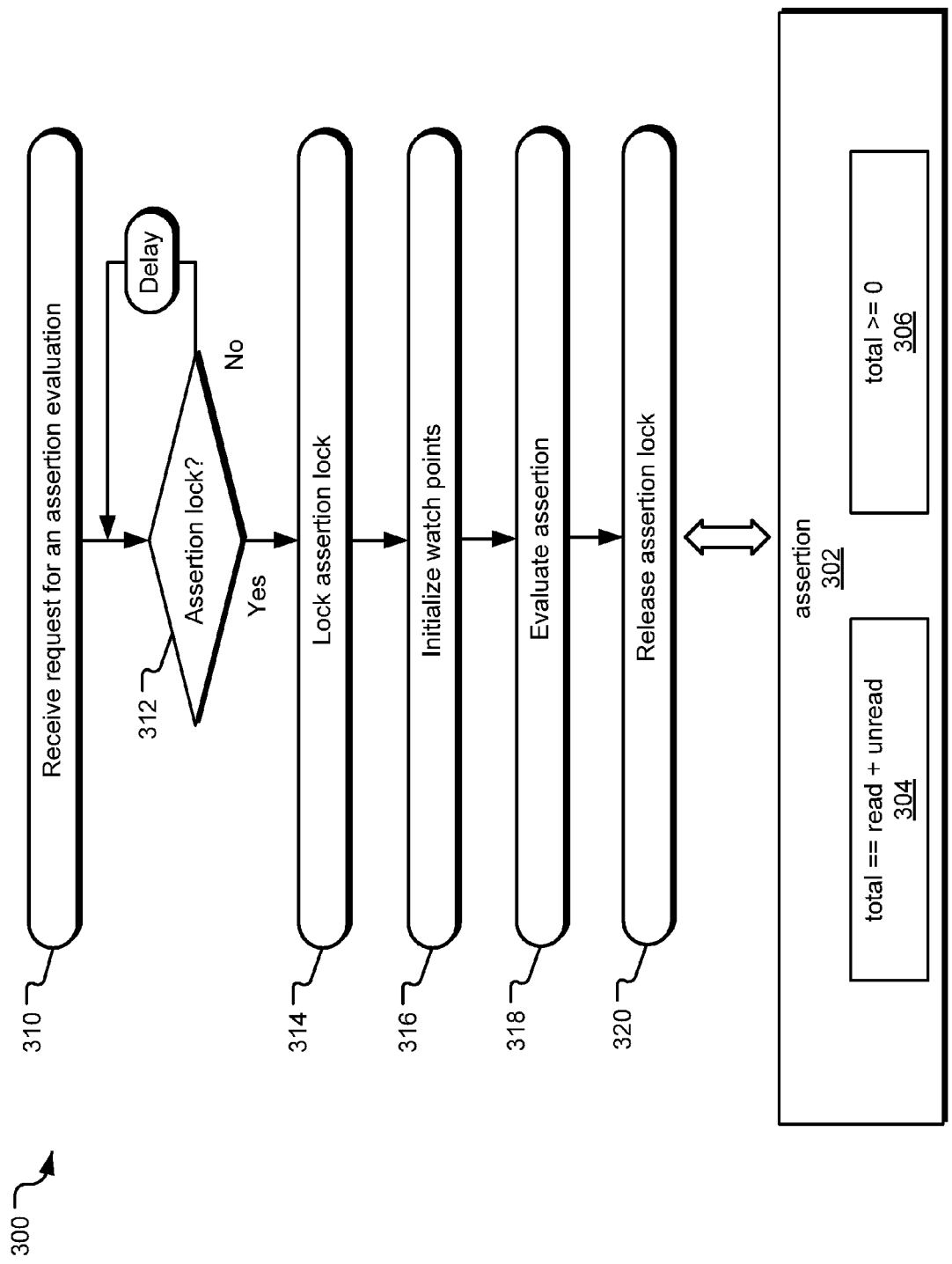
FIG. 3 illustrates example operations for providing atomic assertion evaluations using a concurrency assertions system.

FIG. 3 illustrates example operations 300 for providing atomic assertion evaluations using a concurrency assertions system. Specifically, the operations 300 are configured to ascertain that all expressions of a given assertion are being evaluated contiguously without allowing any changes to any variables of such expressions before evaluation of all expressions is completed. For example, the operations 300 are used to provide atomic evaluation for the expressions of an assertion 302. Specifically, the assertion 302 includes a first expression 304 and a second expression 306. The expressions 304 and 306 share a variable "total." The operations 300 ascertain that both expressions 304 and 306 are evaluated atomically in that the value of the variable "total" is not changed by any other operation between the evaluation of the expressions 304 and 306.

An operation 310 receives a request for initiating an assertion evaluation operation. In response to receiving the request, a determining operation 312 determines if an assertion lock is available. If the assertion lock is available, a locking operation 314 locks an assertion lock. Locking of the assertion lock prevents any other assertions from being evaluated. If the determining operation 312 determines that the assertion lock is not available, the assertion is delayed and after a given amount of time, the determining operation 312 is evaluated again.

Subsequently, an initializing operation 316 initializes watch points on each of the variables used in the assertion to be evaluated. In one implementation, the initializing operation initializes the watch points on all variables of all expressions in the assertion such that if any write access attempt is detected on any of these variables, a flag is generated. In an alternative implementation, the initializing operation 316 initializes watch points on all variables on a memory page, a memory table, etc. Subsequently, an evaluating operation 318 evaluates the assertion. In one implementation, all expressions of the assertion are evaluated contiguously. Once the assertion is evaluated, a releasing operation 320 releases the assertion lock.

Figure 4:
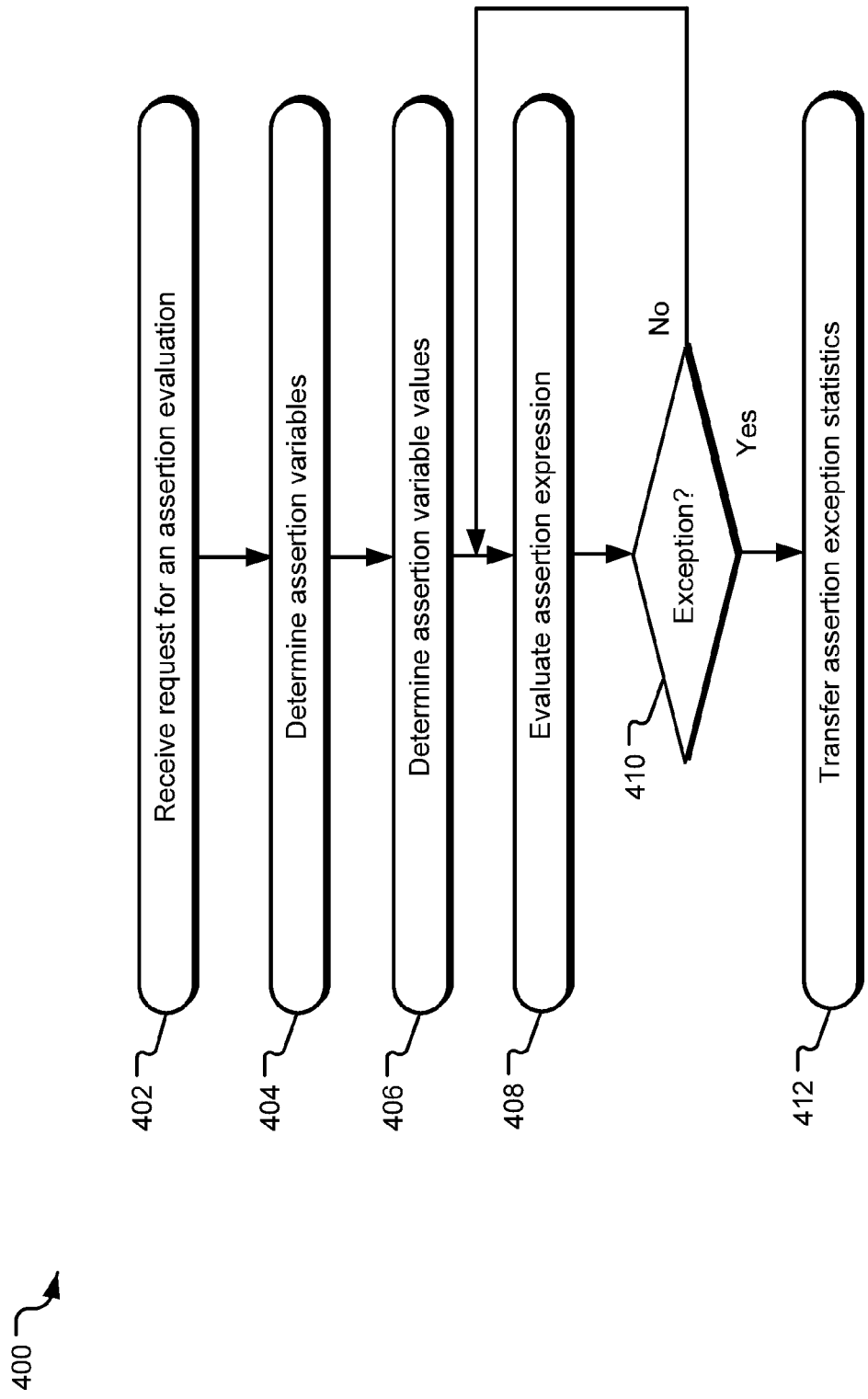
FIG. 4 illustrates example operations for providing exception statistics using a concurrency assertions system.

FIG. 4 illustrates example operations 400 for providing exception statistics using a concurrency assertions system. An operation 402 receives a request for initiating evaluation of an assertion. Subsequently, a determining operation 404 determines the variables affected by the assertion. If there are multiple expressions involved in the assertion, the determining operation determines the variables for each of the expressions in the assertion. Subsequently, another determining operation 406 determines the values of the variables determined at operation 404. In one implementation, the values of all variables in a page that includes the variables of the assertion are determined.

Subsequently, an evaluating operation 408 evaluates the assertion. In one implementation, if the assertion includes more than one expression, the values of the variables are determined after evaluation of each expression in the order specified in the assertion. After evaluation of an individual expression in the assertion, a determining operation 410 determines if an exception is generated. For example such an exception is generated when the evaluation of an expression results in a false output. If it is determined that an exception is generated, a reporting operation 412 initiates transfer of the statistics including the determined values of the variables as an assertion violation state statistics. In an alternative implementation, other statistics, such as the time when the exception was generated, the status of various counters, registers, etc., is also output as part of the assertion violation state statistics.

However, if the determining operation 410 determines that no exception has been generated, the evaluating operation 408 evaluates the next expression that is part of the assertion. The operations 400 provide a user of the assertion the related assertion statistics output to get accurate information about the statistics related to the assertion at the time of the violation of the assertion. Such statistics generated at the time of the violation of an assertion expression improves the debuggability of assertion violations.

FIG. 5 illustrates example operations 500 for providing continuous assertion evaluations using a concurrency assertions system. An operation 502 initiates an assertion evaluation. Subsequently, a timer operation 504 initiates a timer based on a time period selected by a particular implementation of the concurrency assertions system. In one implementation, the time period selected by the timer is randomly chosen. Until the timer runs out, a monitoring block of operations 506 monitors write access attempts to the variables of the assertion as well as requests for other assertion evaluations. For example, a monitoring operation 508 monitors write access attempts. In one implementation, the monitoring operation 508 monitors the write access attempts to the variables by evaluating the operations scheduled to be executed at the current program counter. Thus, for example, the monitoring operation 508 disassembles the operations scheduled to be executed at the current program counter to see if any of these operations include a write access attempt to a variable of the assertion.

If the monitoring operation 508 determines that a write access attempt is detected, a blocking operation 510 blocks the write access attempt. Subsequently, an adding operation 512 adds the blocked write access attempt to a write access attempts queue. In one implementation, the write access attempts queue is a first-in-first-out queue that stores requests for various write access to variables of assertions. In such an implementation, the adding operation 512 adds the write access attempt to the bottom of the write access attempts queue. However, in an alternative implementation, the write access attempts are added based on the priority attached to such write access attempts or based on some other queuing rules.

A determining operation 514 determines if the assertion evaluation is complete. If the determining operation 514 determines that the assertion evaluation is complete, a releasing operation 516 releases one write operation from the write access attempts queue for execution. Subsequently, another determining operation 518 determines if there is any other assertion that needs to be evaluated. If so, the control is transferred to the assertion evaluation operation 502. However, if the determining operation 518 determines that there is no other assertion evaluation to be completed, control is transferred to the operation 516 which releases another write request from the write access attempts queue. Thus, the operations 500 are configured to release one write access attempt from the write access queue in between evaluation of assertions.

FIG. 6 illustrates an example system that may be useful in implementing the described technology. The example hardware and operating environment of FIG. 6 for implementing the described technology includes a computing device, such as general purpose computing device in the form of a gaming console or computer 20, a mobile telephone, a personal data assistant (PDA), a set top box, or other type of computing device. In the implementation of FIG. 6, for example, the computer 20 includes a processing unit 21, a system memory 22, and a system bus 23 that operatively couples various system components including the system memory to the processing unit 21. There may be only one or there may be more than one processing unit 21, such that the processor of computer 20 comprises a single central-processing unit (CPU), or a plurality of processing units, commonly referred to as a parallel processing environment. The computer 20 may be a conventional computer, a distributed computer, or any other type of computer; the invention is not so limited.

The system bus 23 may be any of several types of bus structures including a memory bus or memory controller, a peripheral bus, a switched fabric, point-to-point connections, and a local bus using any of a variety of bus architectures. The system memory may also be referred to as simply the memory, and includes read only memory (ROM) 24 and random access memory (RAM) 25. A basic input/output system (BIOS) 26, containing the basic routines that help to transfer information between elements within the computer 20, such as during start-up, is stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM, DVD, or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, random access memories (RAMs), read only memories (ROMs), and the like, may be used in the example operating environment.

A number of program modules may be stored on the hard disk, magnetic disk 29, optical disk 31, ROM 24, or RAM 25, including an operating system 35, one or more application programs 36, other program modules 37, and program data 38. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port, or a universal serial bus (USB). A monitor 47 or other type of display device is also connected to the system bus 23 via an interface, such as a video adapter 48. In addition to the monitor, computers typically include other peripheral output devices (not shown), such as speakers and printers.

The computer 20 may operate in a networked environment using logical connections to one or more remote computers, such as remote computer 49. These logical connections are achieved by a communication device coupled to or a part of the computer 20; the invention is not limited to a particular type of communications device. The remote computer 49 may be another computer, a server, a router, a network PC, a client, a peer device or other common network node, and typically includes many or all of the elements described above relative to the computer 20, although only a memory storage device 50 has been illustrated in FIG. 6. The logical connections depicted in FIG. 6 include a local-area network (LAN) 51 and a wide-area network (WAN) 52. Such networking environments are commonplace in office networks, enterprise-wide computer networks, intranets and the Internet, which are all types of networks.

When used in a LAN-networking environment, the computer 20 is connected to the local network 51 through a network interface or adapter 53, which is one type of communications device. When used in a WAN-networking environment, the computer 20 typically includes a modem 54, a network adapter, a type of communications device, or any other type of communications device for establishing communications over the wide area network 52. The modem 54, which may be internal or external, is connected to the system bus 23 via the serial port interface 46. In a networked environment, program engines depicted relative to the personal computer 20, or portions thereof, may be stored in the remote memory storage device. It is appreciated that the network connections shown are example and other means of and communications devices for establishing a communications link between the computers may be used.

In an example implementation, various components of a concurrency assertions system may be embodied by instructions stored in memory 22 and/or storage devices 29 or 31 and processed by the processing unit 21. The concurrency variable, the write access attempts queue, and other data may be stored in memory 22 and/or storage devices 29 or 31 as persistent datastores. Further, a concurrency assertions system represents hardware and/or software configured to provide service functionality for network-connected systems. Such services may be implemented using a general purpose computer and specialized software (such as a server executing service software), a special purpose computing system and specialized software (such as a mobile device or network appliance executing service software), or other computing configurations.

Some embodiments may comprise an article of manufacture. An article of manufacture may comprise a storage medium to store logic. Examples of a storage medium may include one or more types of computer-readable storage media capable of storing electronic data, including volatile memory or non-volatile memory, removable or non-removable memory, erasable or non-erasable memory, writeable or re-writeable memory, and so forth. Examples of the logic may include various software elements, such as software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. In one embodiment, for example, an article of manufacture may store executable computer program instructions that, when executed by a computer, cause the computer to perform methods and/or operations in accordance with the described embodiments. The executable computer program instructions may include any suitable type of code, such as source code, compiled code, interpreted code, executable code, static code, dynamic code, and the like. The executable computer program instructions may be implemented according to a predefined computer language, manner or syntax, for instructing a computer to perform a certain function. The instructions may be implemented using any suitable high-level, low-level, object-oriented, visual, compiled and/or interpreted programming language.

The embodiments of the invention described herein are implemented as logical steps in one or more computer systems. The logical operations of the present invention are implemented (1) as a sequence of processor-implemented steps executing in one or more computer systems and (2) as interconnected machine or circuit modules within one or more computer systems. The implementation is a matter of choice, dependent on the performance requirements of the computer system implementing the invention. Accordingly, the logical operations making up the embodiments of the invention described herein are referred to variously as operations, steps, objects, or modules. Furthermore, it should be understood that logical operations may be performed in any order, unless explicitly claimed otherwise or a specific order is inherently necessitated by the claim language.

The above specification, examples, and data provide a complete description of the structure and use of exemplary embodiments of the invention. Since many embodiments of the invention can be made without departing from the spirit and scope of the invention, the invention resides in the claims hereinafter appended. Furthermore, structural features of the different embodiments may be combined in yet another embodiment without departing from the recited claims.

What is claimed is:

1. One or more computer-readable storage hardware media comprising computer-executable instructions for executing on a computer system a computer process, the computer process comprising:
monitoring write access attempts to a variable of an assertion;
blocking the write access attempts;
scheduling the write access attempts in a write access attempts queue until an evaluation of the assertion completes;
releasing the write access attempt from the write access attempts queue after evaluating the assertion;

disassembling an instruction scheduled to execute at a current program counter to determine the write access attempts to the variables of the assertion; and dynamically interpreting assembly instructions of the assertion evaluation.

2. The one or more computer-readable media of claim 1 wherein the process further comprises locking an assertion lock to prevent initiating evaluation of other assertions.

3. The one or more computer-readable media of claim 1 wherein the process of monitoring the write access attempts further comprises monitoring write access attempts to a memory page including the variable of the assertion.

4. The one or more computer-readable media of claim 1 wherein the process of monitoring the write access attempts further comprises monitoring the variable of the assertion with a data watch-point.

5. The one or more computer-readable media of claim 1 wherein the process further comprises generating a notification in response to receiving a write access attempt to the variable of the assertion.

6. The one or more computer-readable media of claim 1 wherein the process further comprises generating a notification if the instruction scheduled to execute at the current program counter is determined to include a write access to the variables of the assertion.

7. A method, comprising:

monitoring write access attempts to a variable of an assertion;

blocking the write access attempts;

scheduling the write access attempts in a write access attempts queue until an evaluation of the assertion completes;

releasing the write access attempt from the write access attempts queue after evaluating the assertion;

disassembling an instruction scheduled to execute at a current program counter to determine the write access attempts to the variables of the assertion; and dynamically interpreting assembly instructions of the assertion evaluation.

8. The method of claim 7, further comprising locking an assertion lock to prevent initiating evaluation of other assertions.

9. The method of claim 7, wherein monitoring the write access attempts further comprises monitoring write access attempts to a memory page including the variable of the assertion.

10. The method of claim 7, wherein monitoring the write access attempts further comprises monitoring the variable of the assertion with a data watch-point.

11. The method of claim 7, further comprising generating a notification in response to receiving a write access attempt to the variable of the assertion.

12. The method of claim 7, further comprising generating a notification if the instruction scheduled to execute at the current program counter is determined to include a write access to the variables of the assertion.

13. A system, comprising:

a processing unit; and a system memory, wherein the system memory comprises code configured to direct the processing unit to:

monitor write access attempts to a variable of an assertion;

block the write access attempts;

schedule the write access attempts in a write access attempts queue until an evaluation of the assertion completes;

release the write access attempt from the write access attempts queue after evaluating the assertion;

disassemble an instruction scheduled to execute at a current program counter to determine the write access attempts to the variables of the assertion; and dynamically interpret assembly instructions of the assertion evaluation.

14. The system of claim 13, further comprising locking an assertion lock to prevent initiating evaluation of other assertions.

15. The system of claim 13, wherein monitoring the write access attempts further comprises monitoring write access attempts to a memory page including the variable of the assertion.

16. The system of claim 13, wherein monitoring the write access attempts further comprises monitoring the variable of the assertion with a data watch-point.

17. The system of claim 13, further comprising generating a notification in response to receiving a write access attempt to the variable of the assertion.

18. The system of claim 13, further comprising generating a notification if the instruction scheduled to execute at the current program counter is determined to include a write access to the variables of the assertion.

* * * * *